Nov. 6, 1956 — P. J. ABEL — 2,769,888

INDUCTION MEANS

Filed May 25, 1954 — 3 Sheets-Sheet 1

INVENTOR.
PAUL J. ABEL
BY Oberlin & Limbach
ATTORNEYS.

Nov. 6, 1956 P. J. ABEL 2,769,888
INDUCTION MEANS
Filed May 25, 1954 3 Sheets-Sheet 2
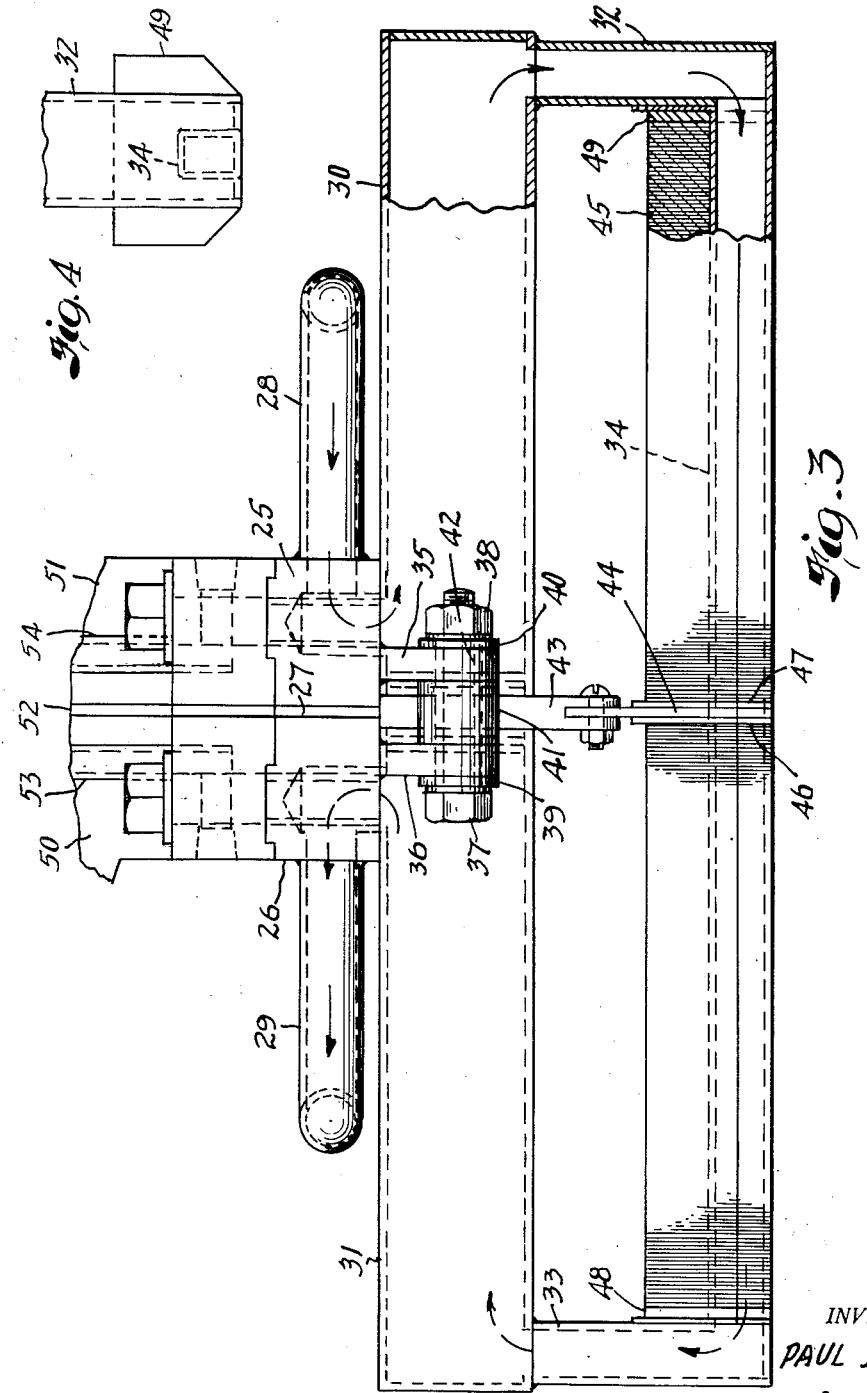
INVENTOR.
PAUL J. ABEL
BY Oberlin & Limbach
ATTORNEYS.

Nov. 6, 1956

P. J. ABEL 2,769,888

INDUCTION MEANS

Filed May 25, 1954

INVENTOR.
PAUL J. ABEL
BY
Oberlin & Limbach
ATTORNEYS.

United States Patent Office 2,769,888
Patented Nov. 6, 1956

2,769,888

INDUCTION MEANS

Paul J. Abel, Cleveland, Ohio, assignor to The Yoder Company, Cleveland, Ohio, a corporation of Ohio Application May 25, 1954, Serial No. 432,290

25 Claims. (Cl. 219—8.5)

This invention relates as indicated to induction means, and more particularly to induction means adapted to heat opposed metal edges, such as the seam edges of a tubular blank, to welding temperature.

Reference may be had to my co-pending application Serial No. 163,189, filed May 20, 1950, now Patent No. 2,737,563, which discloses a method and certain apparatus for welding the opposed seam edges of a continually longitudinally advancing tubular blank. The present invention is particularly concerned with the inductor means itself and certain associated apparatus greatly enhancing the efficiency of the same. When using an induction coil having a portion or leg closely spaced from the seam edges to be heated to welding temperature, in the welding of steel tubing for example, the magnetic field of the inductor may tend to draw the traveling blank toward the inductor, particularly if such blank is of relatively thin sheet metal. Furthermore, when welding steel which has not been pickled or brushed to remove scale, loose particles of such scale are attracted by the electromagnetic field and adhere to the inductor, tending to cause holes to be burned in the latter. Other small metal particles and chips which may have been produced by an edge scarfing tool, for example, likewise tend to build up on the inductor, and it is not feasible to shut down the mill at relatively frequent intervals in order to clean the inductor and ensure trouble-free operation.

It is conventional to cool inductors of the type to which this invention relates by forming the same of relatively pure copper tubing and circulating water therethrough. The inductors nevertheless tend to become overheated, and particularly the iron laminations generally employed in conjunction with the leg of the inductor juxtaposed to the seam to be welded. When the insulation (ordinarily a very thin film) between the laminations is broken down by the heat, it becomes necessary either to replace the same or, more usually, to discard the entire inductor.

Since tube forming mills and flying shears are now available which are capable of producing metal tubing at the rate of several hundred feet per minute and cutting such tubing into suitable lengths, the rate of welding is limited by the power the inductor is capable of handling, especially in the case of relatively thick walled tubing or pipe. It is possible to use a series of inductors aligned along the seam, but there are usually space limitations as well as the matter of increased cost to be considered.

It is accordingly a principal object of my invention to provide supplemental means for cooling the inductor greatly to extend the life and increase the operating efficiency of the latter.

Another object is to provide means associated with the inductor operative automatically to prevent accumulations of magnetic scale and the like on the inductor and thereby to ensure the maintenance of optimum operating conditions.

Still another object is to provide means which will thus prevent the build-up of magnetic scale and the like on the inductor and which will at the same time cooperate with the cooling means to prevent overheating of the inductor.

A further object is to provide means effective to hold the longitudinally traveling blank precisely in the proper pass adjacent the induction means despite the magnetic attraction of the latter.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 3 is a side elevational view of a single inductor unit, on a considerably enlarged scale;

Fig. 4 is an end view of the lower portion of the inductor;

Figure 1:
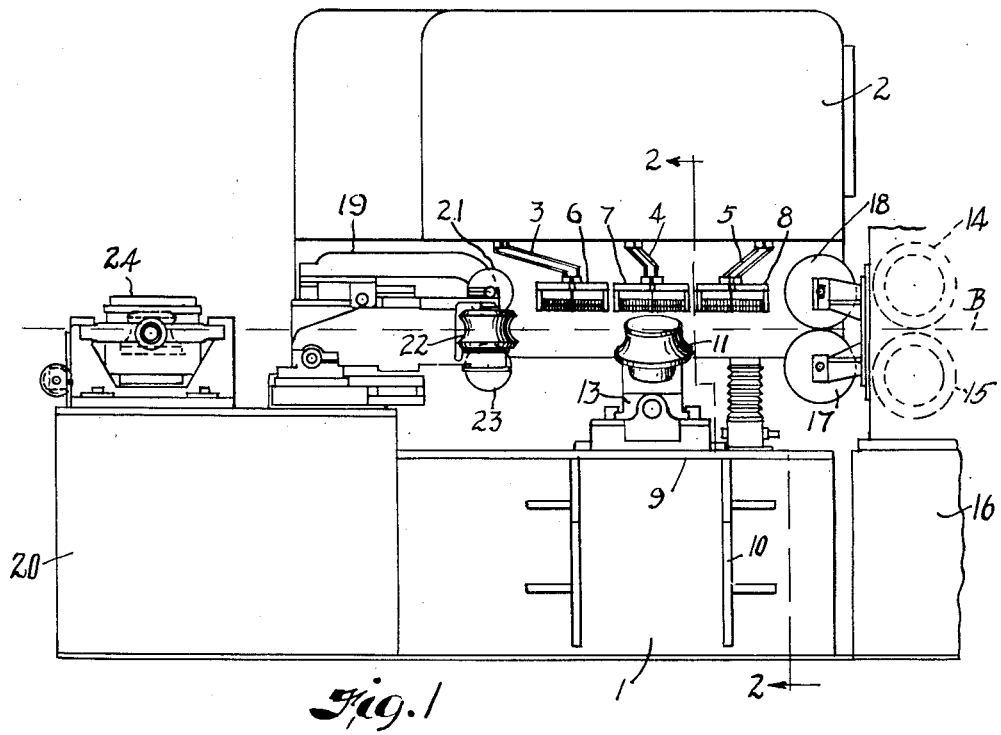
Fig. 1 is a front elevational view of the welding unit of a tube mill adapted for employment in accordance with my invention, certain elements being omitted to afford a better view of the general assembly.
Figure 7:
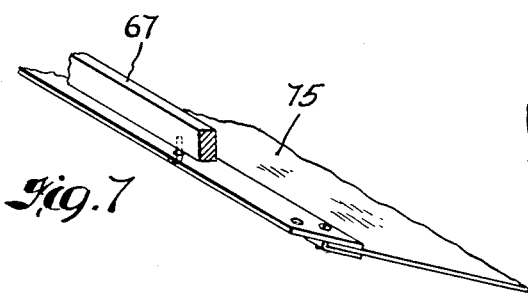
Fig. 7 is a fragmentary perspective view of one element of the apparatus of Figs. 4 and 5.
Figure 2:
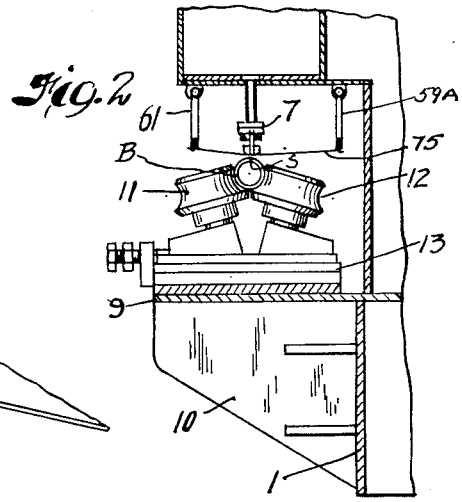
Fig. 2 is a vertical section on the line 2—2 taken on Fig. 1, showing certain associated mechanism.

Referring now more particularly to Fig. 1 of the drawing, the units there shown comprise a base frame 1 supporting an oscillator or high frequency generator 2 having three sets of depending leads 3, 4 and 5 supporting three corresponding inductors 6, 7 and 8. On a lower forward deck 9 supported by brackets 10 there is mounted a pair of work gripping rolls 11 and 12 on axes inclined slightly from the vertical. Such rolls are of non-magnetic material such as bonded sapphire or other ceramic material, and bronze. The rolls are mounted on slides 13 for adjustment toward and away from one another to grip the tubular blank B therebetween with about one-quarter to one-third of the periphery of the latter exposed at the upper side of the blank with the seam S to be welded uppermost and centered directly beneath the inductor units. Such rolls accordingly not only serve properly to position the blank laterally in its pass beneath the induction means, but also position such blank vertically, holding it so that it cannot be drawn upwardly by the electromagnetic field of such means.

In Fig. 1 there are also shown the last two rolls 14 and 15 of the tube mill 16, followed by a supporting roll 17 opposed to an upper rotary seam guide 18 having a narrow peripheral fin adapted to enter the slightly open seam to position the same for continued travel directly beneath the inductors 6, 7 and 8.

Following the induction heating stage is a squeeze roll assembly 19 adjustably mounted on box frame 20 and including rolls 21, 22 and 23, preferably of non-magnetic material, bearing on blank B to force the opposed seam edges together into welding engagement, ordinarily including a certain degree of forging action. This is followed by a sizing roll assembly 24 also mounted on box frame 20 and adapted to reduce the diameter of the welded tubing to exact desired dimensions. The rolls of such latter assembly may be power driven, if desired, in proper synchronism with the forming rolls of the tube mill 16. As explained in my prior Patent No. 2,737,563, the finished tubing will then proceed to a flying shear which will cut the tubing into desired lengths. A cutting tool (not shown) of conventional type may be interposed between the squeeze roll assembly and the sizing roll assembly to trim any bead formed in the welding operation.

Now referring more particularly to Fig. 3 of the drawing, a preferred form of inductor for my purpose is there illustrated comprising hollow electrical connecting blocks 25 and 26 separated by an insulating spacer 27. Coolant tubes 28 and 29 communicate with the interior of such blocks for the purpose of circulating a cooling fluid, usually water, through the inductor. Such blocks, tubes, and the current carrying portions of the inductor proper are preferably formed of electrolytic copper of high purity. Such inductor comprises an upper horizontal leg 30 of substantially square cross-section extending from block 25 and a similar hollow leg 31 extending in the opposite direction from block 26. Smaller tubular conductor portions of rectangular cross-section 32 and 33 extend downwardly from the respective ends thereof and are joined to a lower horizontal leg 34 of reduced cross-section extending parallel to legs 30 and 31 and substantially spaced therefrom. A pair of laterally extending wings 35 and 36 protrude from blocks 25 and 26 on each side of the inductor and are joined by means of bolts 37 and nuts 38 insulated from such wings by appropriate insulating washers 39 and 40, insulating spacers 41, and inner tubular insulating spacers 42. An insulating spacer member 43 is interposed between the opposed inner ends of legs 30 and 31 and fits in shallow recesses in the same. A brass support plate 44 depends from insulating spacer 43 and is formed or notched to afford a downwardly opening yoke closely embracing lower leg 34 to which it is sweated or brazed. Such lower leg 34 is accordingly held rigidly at its mid point as well as at the two ends thereof. A very large number of transverse permeable soft iron or silicon steel laminations 45 are similarly notched closely to fit lower leg 34 and are sweated thereon, such laminations extending upwardly from such leg a distance approximately equal to the vertical width of the leg and laterally in their upper portions a distance slightly exceeding the transverse thickness of such leg. The laminations taper downwardly on each side to afford pole faces even with the underside of leg 34 and of a width equal to about one-half the extent of such lateral projection of the upper portions of the laminations. Insulating sheets or plates 46 and 47 are interposed between supporting plate or yoke 44 and the adjacent laminations 45. Copper spacer plates 48 and 49 of appreciable thickness (e. g. ³⁄₃₂ inch) and of a conformation corresponding to laminations 45 are interposed between the last of such laminations and vertical conductor portions 33 and 32 and sweated to leg 34. The tendency of the inductor to overheat in such extreme end portions is thereby considerably reduced. The soft iron or silicon steel laminations 45 are only several thousandths of an inch thick and insulated from each other by oxide coatings. The exact form and contour of the same may be modified depending on the particular application. As shown in Fig. 3, they are well spaced from the upper legs or supply conductor portions 30 and 31. The conductors which support the inductor as shown in Fig. 1 comprise lead portion 50 connected to block 26 and lead portion 51 connected with block 25, such leads being separated by an insulating spacer 52 and provided with their own ducts 53 and 54 for circulation of cooling water.

Figure 5:
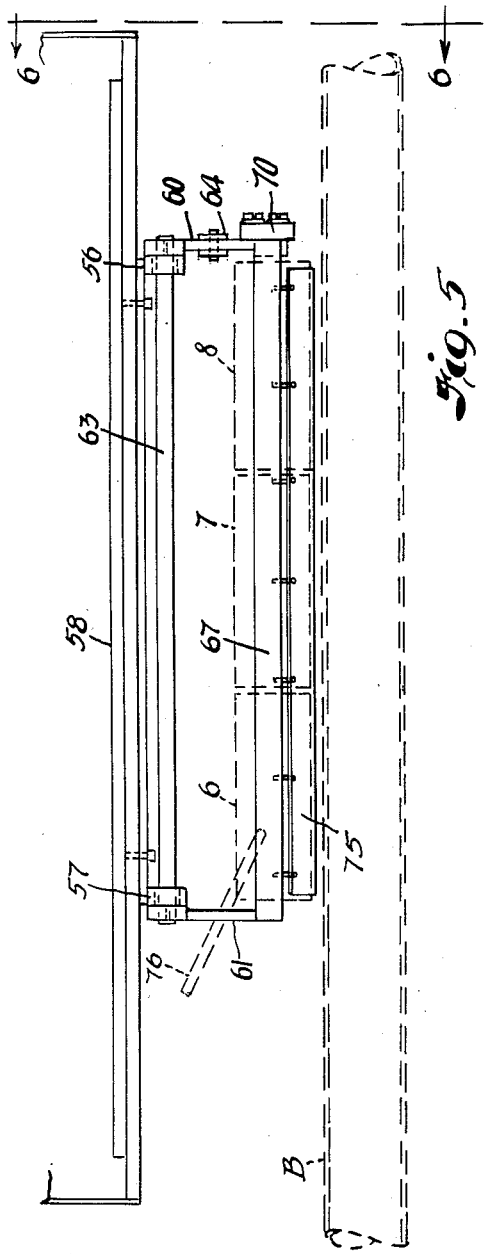
Fig. 5 is a side elevational view of the novel means associated with the inductor units for preventing adherence of scale to the latter and assisting in cooling of the inductors.
Figure 6:
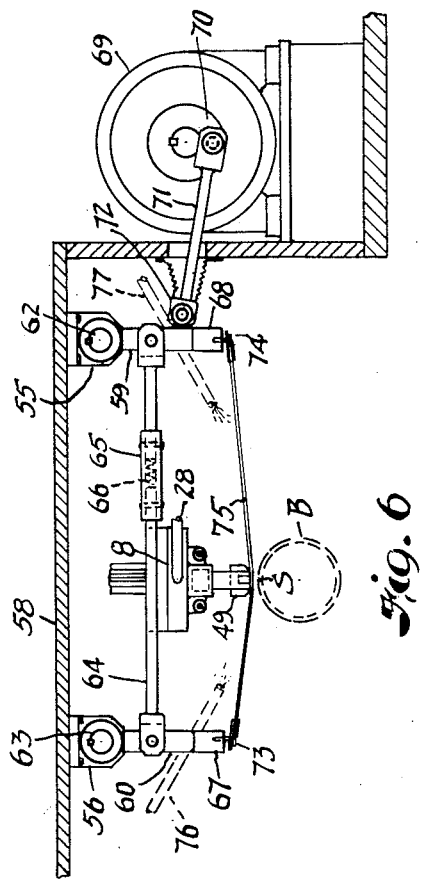
Fig. 6 is a view of the assembly of Fig. 4 longitudinally of the path of travel of the tube blank, taken on the line 6—6 on Fig. 5.

As best shown in Figs. 5 and 6, I employ a special device in conjunction with such induction units for the prevention of scale build-up on such units and also to assist in more efficient cooling of the same. Brackets such as 55, 56 and 57 are mounted on the underside of housing overhang 58 above the path of travel of tube blank B with two of the brackets being on one side of the induction units and two of the brackets on the other side of such units. Lever arms including 59, 60 and 61 are keyed to shafts 62 and 63 pivotally mounted in such brackets and extending parallel to the path of travel of the tube blank. Depending lever arms 59 and 60 are interconnected by cross-rod 64 including a sliding joint 65 having a compression spring 66 therein. Side bars 67 and 68 rigidly connect lever arms 60 with 61 and 59 with 59A. It will accordingly be seen that all four depending lever arms will rock in unison when appropriately impelled. For this purpose, an electric gear motor 69 is provided having an eccentric or crank 70 and crank rod 71 pivotally connected at 72 to lever arm 68. By this means, all four lever arms may be caused to rock in unison at a rate of, for example, 100 return oscillations per minute. The lower sides of bars 67 and 68 are provided with a series of outturned hooks 73 and 74 to which a web of flexible sheet material 75 is removably attached, temporary compression of spring 66 facilitating this operation. Inasmuch as bars 67 and 68 are somewhat above the level of the underside of leg 34 of the induction means, the web 75 is held in engagement with the latter and somewhat depressed where thus engaged (Fig. 6). By locating the outer lever arms 60 and 61 somewhat closer to the path of tube blank travel than lever arms 59 and 59A, access to the inductors is somewhat facilitated without interfering with efficient operation of the other apparatus.

Water supply tubes 76 and 77 project inwardly over web 75 and serve to flood the latter with water on both sides of the induction means, the web being stretched in the form of a shallow trough as shown in Fig. 6. The water may ordinarily reach a depth equal to one-half the vertical extent of the laminations 45 and assists greatly in cooling the same and prolonging the life of the induction units. Scale and small metal particles drawn upwardly from the traveling blank by the magnetic field of the inductors impinge the underside of web 75 and as the latter reciprocates, they are carried laterally to a point where the magnetic field is too weak any longer to retain them and there dropped. The reversal of direction of reciprocation of web 75 further assists in discharging such particles laterally and, if desired, air jets (not shown) may be directed against the underside of the web further to assist in discharging such particles.

Web 75 will preferably be formed of glass fiber textile material impregnated and coated with a melamine resin, such materials being non-magnetic, tough and wear-resistant, and capable of withstanding the heat to which they are subjected in use. They are, moreover, electrically non-conductive. Other materials having these qualities may, however, likewise be employed.

Utilizing mechanism as above described, I have been enabled successfully to weld tube blanks of unpickled steel at a rate on the order of about 200 feet per minute without the usual early destruction of the expensive inductor units either by scale build-up thereon or by overheating. The number of inductors employed may be one or more, depending on the particular operation and the rate of production desired. Very accurate and precise control of the welding operation is obtained and the blank is constrained to travel in the precise desired path by means of the control rolls 11 and 12, these latter being particularly desirable when a plurality of inductors are utilized so that there is a relatively long pass between the seam guide and the squeeze roll assembly. The water flooding of the web 75 is particularly useful in preventing overheating of the end portions (especially the last few magnetically permeable laminations 45). With this equipment I have produced excellent welds whereas it is not possible to obtain a satisfactory weld of scale-coated stock on a rotary electrode resistance type mill.

While certain non-ferrous metals may be welded with employment of my new apparatus, it is much more efficient in welding steel. Moreover, any opposed metal edges may be thus joined but the principal use of the invention is in the welding of steel tubing. Thus, a single mill may be adjustable to weld steel tubing of from ½ inch to 4 inches outer diameter and having a wall thickness ranging from .027 inch to .188 inch, for example. A high frequency alternating current on the order of 10,000 cycles is suitable but the exact frequency employed may be varied depending on the tube wall thickness, the rate of tube blank travel, and other factors as well understood by those skilled in the art.

The wiper mechanism including lever arms 59, 59A, 60, and 61, and associated parts will preferably be of brass to avoid overheating. Tubes 76 and 77 will desirably be of copper.

The exact point where the seam edges of the blank come together is not important but will ordinarily be some distance in advance of the squeeze roll assembly. Such seam edges should be closely opposed during their travel beneath the induction means for maximum heating effect.

The insulating spacers may be of melamine resin or Micarta, for example, and various suitable insulating materials are known to those skilled in the art. The wiper sheet material or web may preferably be of glass fiber or asbestos reinforced melamine-formaldehyde resin.

Other modes of applying the principle of the invention may be employed, change being made as regards the details described, provided the features stated in any of the following claims or the equivalent of such be employed.

I therefore particularly point out and distinctly claim as my invention:

1. In apparatus for the continuous manufacture of welded tubing including forming means operative to form a continuous metal strip to generally tubular form with the edges of such strip closely opposed in a continuous longitudinal seam, and means operative continuously axially to advance the same; electric induction means operative to induce heating current in the tubular blank thus formed in the region of such seam only to heat the opposed seam edge portions to welding temperature, pressure means at a closely following station adapted to force such heated opposed seam edges together in welding engagement, and a web of non-magnetic, electrically non-conductive, heat resistant material interposed between such tubular blank and said induction means.

2. In apparatus for the continuous manufacture of welded tubing including forming means operative to form a continuous metal strip to generally tubular form with the edges of such strip closely opposed in a continuous longitudinal seam, and means operative continuously axially to advance the same; electric induction means operative to induce heating current in the tubular blank thus formed in the region of such seam only to heat the opposed seam edge portions to welding temperature, pressure means at a closely following station adapted to force such heated opposed seam edges together in welding engagement, a web of non-magnetic, electrically non-conductive, heat resistant material interposed between such tubular blank and said induction means and contacting the latter, and means operative laterally to reciprocate said web.

3. In apparatus for the continuous manufacture of welded tubing including forming means operative to form a continuous metal strip to generally tubular form with the edges of such strip closely opposed in a continuous longitudinal seam, and means operative continuously axially to advance the same; electric induction means operative to induce heating current in the tubular blank thus formed in the region of such seam only to heat the opposed seam edge portions to welding temperature, pressure means at a closely following station adapted to force such heated opposed seam edges together in welding engagement, a web of non-magnetic, electrically non-conductive, heat resistant material interposed between such tubular blank and said induction means and contacting the latter, and means operative laterally to reciprocate said web at a rate of approximately 100 return oscillations per minute.

4. In apparatus for the continuous manufacture of welded tubing including forming means operative to form a continuous metal strip to generally tubular form with the edges of such strip closely opposed in a continuous longitudinal seam, and means operative continuously axially to advance the same; electric induction means operative to induce heating current in the tubular blank thus formed in the region of such seam only to heat the opposed seam edge portions to welding temperature, pressure means at a closely following station adapted to force such heated opposed seam edges together in welding engagement, a web of non-magnetic, electrically non-conductive, heat resistant material interposed between such tubular blank and said induction means, and means arranged to deliver cooling liquid to the upper surface of said web to bathe and cool said induction means.

5. In apparatus for the continuous manufacture of welded tubing including forming means operative to form a continuous metal strip to generally tubular form with the edges of such strip closely opposed in a continuous longitudinal seam, and means operative continuously axially to advance the same; electric induction means operative to induce heating current in the tubular blank thus formed in the region of such seam only to heat the opposed seam edge portions to welding temperature, pressure means at a closely following station adapted to force such heated opposed seam edges together in welding engagement, a web of non-magnetic, electrically non-conductive, heat resistant material interposed between such tubular blank and said induction means and contacting the latter, means operative laterally to reciprocate said web, and means arranged to deliver cooling liquid to the upper surface of said web to bathe and cool said induction means.

6. In apparatus for the continuous manufacture of welded tubing including forming means operative to form a continuous metal strip to generally tubular form with the edges of such strip closely opposed in a continuous longitudinal seam, and means operative continuously axially to advance the same; electric induction means operative to induce heating current in the tubular blank thus formed in the region of such seam only to heat the opposed seam edge portions to welding temperature, pressure means at a closely following station adapted to force such heated opposed seam edges together in welding engagement, a web of non-magnetic, electrically non-conductive, heat resistant material interposed between such tubular blank and said induction means and contacting the latter to form a longitudinally extending trough-like depression in said web, and means operative laterally to reciprocate said web with consequent flexing of the web.

7. In apparatus for the continuous manufacture of welded tubing including forming means operative to form a continuous metal strip to generally tubular form with the edges of such strip closely opposed in a continuous longitudinal seam, and means operative continuously axially to advance the same; electric induction means operative to induce heating current in the tubular blank thus formed in the region of such seam only to heat the opposed seam edge portions to welding temperature, pressure means at a closely following station adapted to force such heated opposed seam edges together in welding engagement, a web of non-magnetic, electrically non-conductive, heat resistant material interposed between such tubular blank and said induction means and contacting the latter to form a longitudinally extending trough-like depression in said web, means operative laterally to reciprocate said web with consequent flexing of the web, and means adapted to deliver a stream of cooling liquid to the upper surface of said web to bathe and cool the portion of said induction means opposed to such seam edge portions of the tubular blank and lying in such trough-like depression.

8. In apparatus for induction heating a relatively moving work-piece including an inductor portion adapted to be juxtaposed to such work-piece, a web of non-magnetic, electrically non-conductive, heat resistant material interposed between said inductor portion and the work to prevent accumulation of magnetic particles on said inductor portion from such work, and means operative to move said web transversely of the path of movement of such work-piece.

9. In apparatus for induction heating a work-piece including an inductor portion adapted to be juxtaposed to such work-piece, a web of non-magnetic, electrically non-conductive, heat resistant material interposed between said inductor portion and the work to prevent accumulation of magnetic particles on said inductor portion from such work, and means for laterally reciprocating said web.

10. In apparatus for induction heating a work-piece including an inductor portion adapted to be juxtaposed to such work-piece, a web of non-magnetic, electrically non-conductive, heat resistant material interposed between said inductor portion and the work to prevent accumulation of magnetic particles on said inductor portion from such work, and means operative laterally to reciprocate said web to carry adherent magnetic particles laterally beyond the effective limit of the magnetic field of the inductor and mechanically to discharge the same.

11. In apparatus for induction heating a work-piece including an inductor portion adapted to be juxtaposed to such work-piece, a web of non-magnetic, electrically non-conductive, heat resistant material interposed between said inductor portion and the work, and means operative to deliver a cooling fluid to the surface of said web adjacent said inductor portion externally to cool the latter without cooling the opposed portion of the work.

12. In apparatus for induction heating a work-piece including an inductor portion adapted to be juxtaposed to such work-piece, a web of non-magnetic, electrically non-conductive, heat resistant material interposed between said inductor portion and the work, and means operative to deliver a cooling fluid to the surface of said web adjacent said inductor portion externally to cool the latter without cooling the opposed portion of the work, said inductor portion and web lying in general horizontal planes with said web being trough-shaped to assist in confining such fluid about said inductor portion.

13. In apparatus for induction heating a work-piece including an inductor portion adapted to be juxtaposed to such work-piece, a web of sheet material interposed between said inductor portion and the work to prevent accumulation of magnetic particles on said inductor portion from such work, and means for reciprocating said web.

14. In apparatus for induction heating a work-piece including an inductor portion adapted to be juxtaposed to such work-piece, a web of sheet material interposed between said inductor portion and the work to prevent accumulation of magnetic particles on said inductor portion from such work, and means for reciprocating said web, said web being formed of glass fiber sheet material impregnated and coated with melamine resin.

15. In apparatus for the continuous manufacture of welded tubing including forming means operative to form a continuous metal strip to generally tubular form with the edges of such strip closely opposed in a continuous longitudinal seam, and means operative continuously axially to advance the same; electric induction means operative to induce heating current in the tubular blank thus formed in the region of such seam only to heat the oposed seam edge portions to welding temperature, pressure means at a closely following station adapted to force such heated opposed seam edges together in welding engagement, a web of non-magnetic, electrically non-conductive, heat resistant material interposed between such tubular blank and said induction means and contacting the latter to form a longitudinally extending trough-like depression in said web, means operative laterally to reciprocate said web with consequent flexing of the web, and means adapted to deliver a stream of cooling liquid to the upper surface of said web to bathe and cool the portion of said induction means opposed to such seam edge portions of the tubular blank and lying in such trough-like depression, said inductor portion including transverse magnetically permeable insulated laminations mounted thereon and laterally beveled at their undersides.

16. In apparatus for the continuous manufacture of welded tubing including forming means operative to form a continuous metal strip to generally tubular form with the edges of such strip closely opposed in a continuous longitudinal seam, and means operative continuously axially to advance the same; electric induction means operative to induce heating current in the tubular blank thus formed in the region of such seam only to heat the opposed seam edge portions to welding temperature, pressure means at a closely following station adapted to force such heated opposed seam edges together in welding engagement, a web of non-magnetic, electrically non-conductive, heat resistant material interposed between such tubular blank and said induction means and contacting the latter to form a longitudinally extending trough-like depression in said web, a frame adapted thus to support said web, eccentric means operative laterally to reciprocate said frame and web with consequent flexing of the web, and means adapted to deliver a stream of cooling liquid to the upper surface of said web to bathe and cool the portion of said induction means opposed to such seam edge portions of the tubular blank and lying in such trough-like depression.

17. In apparatus for the continuous manufacture of welded tubing including forming means operative to form a continuous metal strip to generally tubular form with the edges of such strip closely opposed in a continuous longitudinal seam, and means operative continuously axially to advance the same; electric induction means operative to induce heating current in the tubular blank thus formed in the region of such seam only to heat the opposed seam edge portions to welding temperature, pressure means at a closely following station adapted to force such heated opposed seam edges together in welding engagement, a web of non-magnetic, electrically non-conductive, heat resistant material interposed between such tubular blank and said induction means and contacting the latter to form a longitudinally extending trough-like depression in said web, a frame adapted thus to support said web, eccentric means operative laterally to reciprocate said frame and web with consequent flexing of the web, and means adapted to deliver a stream of cooling liquid to the upper surface of said web to bathe and cool the portion of said induction means opposed to such seam edge portions of the tubular blank and lying in such trough-like depression, said web being detachably secured to said frame, and said frame including compressible resilient means operative to spread said frame to stretch said web.

18. The method of cooling a high frequency electrical inductor which comprises passing a cooling liquid through the interior of such inductor, simultaneously bathing the exterior of such inductor with cooling liquid, and temporarily confining the flow of such latter liquid to the region of such inductor by interposing a thin web of sheet material between such inductor and the subjacent work.

19. The method of cooling a high frequency electrical inductor which comprises bathing the exterior of such inductor with cooling liquid, and interposing a thin web of sheet material between such inductor and the work arranged to keep such liquid temporarily in contact with such inductor and locally out of contact with such work.

20. In a method of induction heating traveling work by means of a high frequency inductor closely spaced therefrom and which tends normally to accumulate magnetic particles attracted from such work, laterally reciprocating a sheet of non-magnetic material interposed between such inductor and such work to intercept such particles and discharge the same laterally of the work.

21. In apparatus for the continuous manufacture of welded tubing including forming means operative to form a continuous metal strip to generally tubular form with the edges of such strip closely opposed in a continuous longitudinal seam, and means operative continuously axially to advance the same; electric induction means positioned adjacent the seam edge portion only of such strip operative to induce heating current in the tubular blank thus formed in the region of such seam only to heat the opposed seam edge portions to welding temperature, pressure means at a closely following station adapted to force such heated opposed seam edges together in welding engagement, and opposed non-magnetic rolls adapted to grip such blank therebetween laterally of the respective seam edges intermediate said forming means and said following pressure means to hold such blank in a straight path therebetween and resist the magnetic attraction of said induction means.

22. In apparatus for the continuous manufacture of welded tubing including forming means operative to form a continuous metal strip to generally tubular form with the edges of such strip closely opposed in a continuous longitudinal seam, and means operative continuously axially to advance the same; electric induction means operative to induce heating current in the tubular blank thus formed in the region of such seam only to heat the opposed seam edge portions to welding temperature, pressure means at a closely following station adapted to force such heated opposed seam edges together in welding engagement, and opposed non-magnetic rolls shaped and positioned to grip such blank therebetween laterally of the respective seam edges intermediate said forming means and said following pressure means to hold such blank in a straight path therebetween and resist the magnetic attraction of said induction means, said non-magnetic rolls being inclined toward each other to expose such seam edge portions while effectively gripping and guiding such blank.

23. In induction welding apparatus for butt welding two adjacent edge portions of electrically conductive material; an inductor loop of copper tubing including a straight portion adapted to lie closely spaced from such edge portions of the work, legs extending from said straight portion normal thereto, and undivided supply conductor portions connected with said legs and extending toward each other parallel to said straight portion; and elongated magnetically permeable means having a face formed with a groove receiving and closely fitting said straight portion of said loop so as to form two elongated pole faces on each side of said straight portion opposed to such work, said magnetically permeable means being widely spaced from said supply conductor portions.

24. In induction welding apparatus for butt welding two adjacent edge portions of electrically conductive material; an inductor loop of copper tubing including a straight portion adapted to lie closely spaced from such edge portions of the work, legs extending from said straight portion normal thereto, and undivided supply conductor portions connected with said legs and extending toward each other parallel to said straight portion; elongated magnetically permeable means having a face formed with a groove receiving and closely fitting said straight portion of said loop so as to form two elongated pole faces on each side of said straight portion opposed to such work, said magnetically permeable means being widely spaced from said supply conductor portions; and insulated brace means interposed between said opposed supply conductor portions and engaging the mid-portion of said straight portion of said loop to rigidify the same.

25. The apparatus of claim 24 including a web of non-magnetic, electrically non-conductive heat resistant material contacting said straight portion of the inductor loop and adapted to lie between the latter and such work, and means operative laterally to reciprocate said web.

References Cited in the file of this patent

UNITED STATES PATENTS

| | | |
|---|---|---|
| 747,841 | Baehr | Dec. 22, 1903 |
| 1,861,870 | Long | June 7, 1932 |
| 1,986,370 | Sessions | Jan. 1, 1935 |
| 2,635,177 | Body et al. | Apr. 14, 1953 |
| 2,672,550 | Vaughan | Mar. 16, 1954 |